(12) United States Patent
Kiefer et al.

(10) Patent No.: US 9,476,131 B2
(45) Date of Patent: Oct. 25, 2016

(54) ELECTROCHEMICAL CELL HAVING A FRAME SEAL FOR ALTERNATIVE SEALING AGAINST MARGINAL LEAKAGES OF THE ELECTROLYTE

(75) Inventors: Randolf Kiefer, Marl (DE); Peter Woltering, Neuenkirchen (DE); Rainer Weber, Odenthal (DE); Andreas Bulan, Langenfeld (DE); Michael Grossholz, Leverkusen (DE)

(73) Assignee: UHDENORA S.P.A., Milan (IT)

( * ) Notice: Subject to any disclaimer, the term of this patent is extended or adjusted under 35 U.S.C. 154(b) by 366 days.

(21) Appl. No.: 14/009,457

(22) PCT Filed: Apr. 19, 2012

(86) PCT No.: PCT/EP2012/001682
§ 371 (c)(1),
(2), (4) Date: Dec. 13, 2013

(87) PCT Pub. No.: WO2012/152367
PCT Pub. Date: Nov. 15, 2012

(65) Prior Publication Data
US 2014/0093811 A1 Apr. 3, 2014

(30) Foreign Application Priority Data
May 6, 2011 (DE) .................. 10 2011 100 768

(51) Int. Cl.
*H01M 8/0273* (2016.01)
*H01M 2/08* (2006.01)
*C25B 9/08* (2006.01)
*C25B 9/20* (2006.01)

(52) U.S. Cl.
CPC .. *C25B 9/08* (2013.01); *C25B 9/20* (2013.01)

(58) Field of Classification Search
None
See application file for complete search history.

(56) References Cited

U.S. PATENT DOCUMENTS

| 4,274,939 A | 6/1981 | Bjaeareklint |
| 4,748,092 A | 5/1988 | Hekal |
| 8,628,894 B2 * | 1/2014 | Shimazoe ........... H01M 8/0276 429/463 |
| 2003/0027032 A1 | 2/2003 | Sugita |

FOREIGN PATENT DOCUMENTS

| JP | 61056290 | 3/1986 |
| WO | 01/57290 | 8/2001 |

OTHER PUBLICATIONS

International Search Report issued in counterpart PCT Application No. PCT/EP2012/001682.

\* cited by examiner

*Primary Examiner* — Tracy Dove
(74) *Attorney, Agent, or Firm* — Lucas & Mercanti, LLP

(57) ABSTRACT

The invention relates to an electrochemical cell comprising an anode and a cathode compartment separated by a membrane, housing corresponding electrodes. The anode and the cathode compartments having external walls with frame-type flanged areas in the contact area of both compartments. The flanged areas having mounting bores marking an inner area and an outer area of the electrochemical cell a, gas-diffusion electrode resting on a support system, a porous material resting on the gas-diffusion electrode, and devices for the inlet and outlet of gas and electrolyte. At least one circumferential gasket frame is in the contact area of both compartments, between the frame-type flanged areas of the external walls of both compartments, said gasket resting on the membrane, with the porous material and the gas-diffusion electrode resting on the frame-type cathodic flanged area and the circumferential gasket frame overlapping in this area with the porous material and the gas-diffusion electrode.

15 Claims, 6 Drawing Sheets

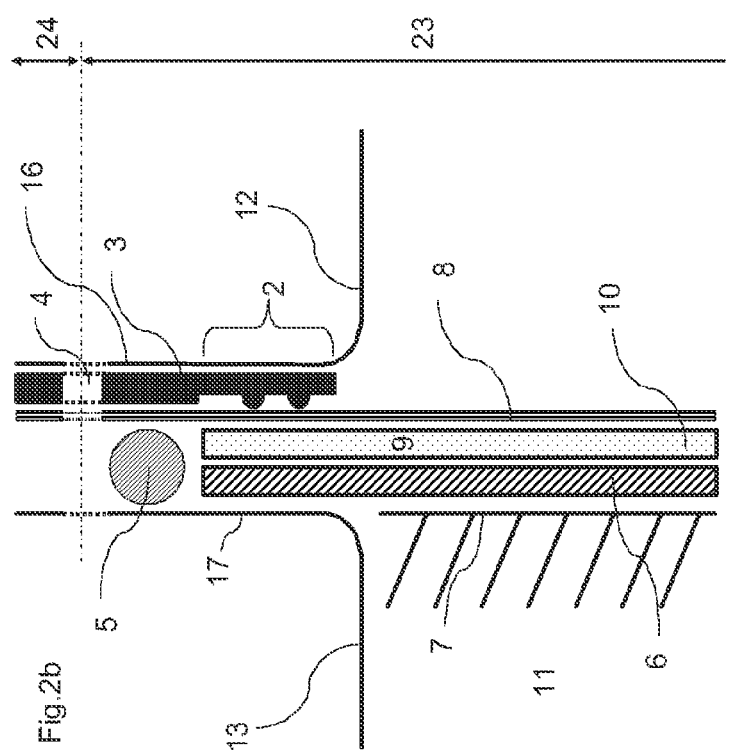
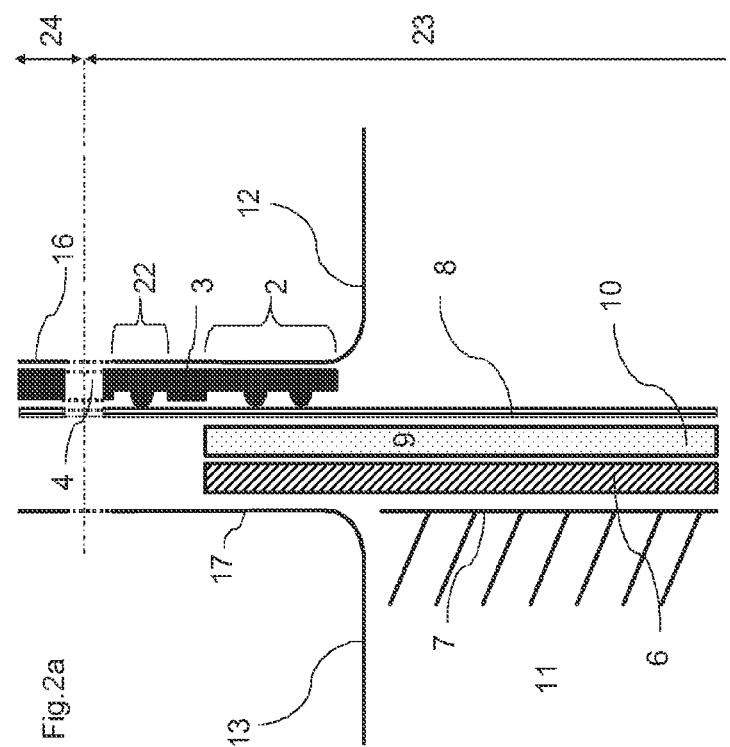

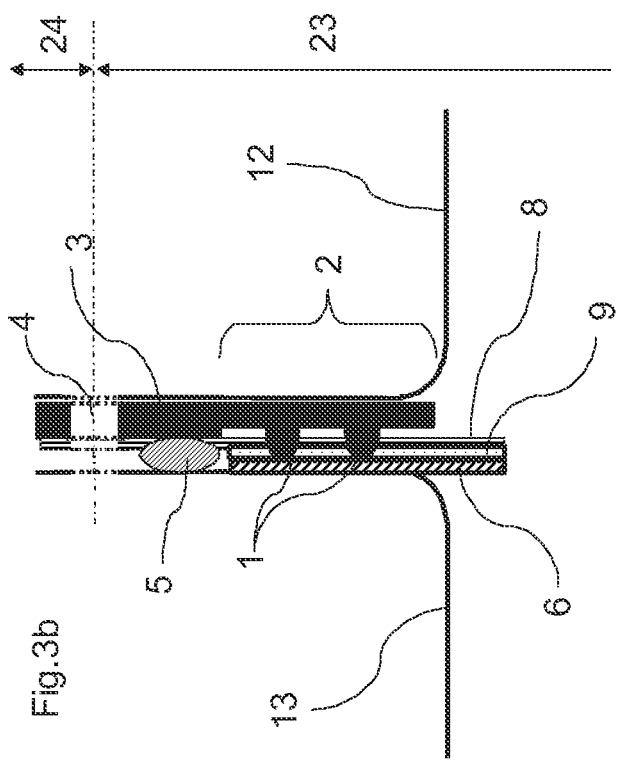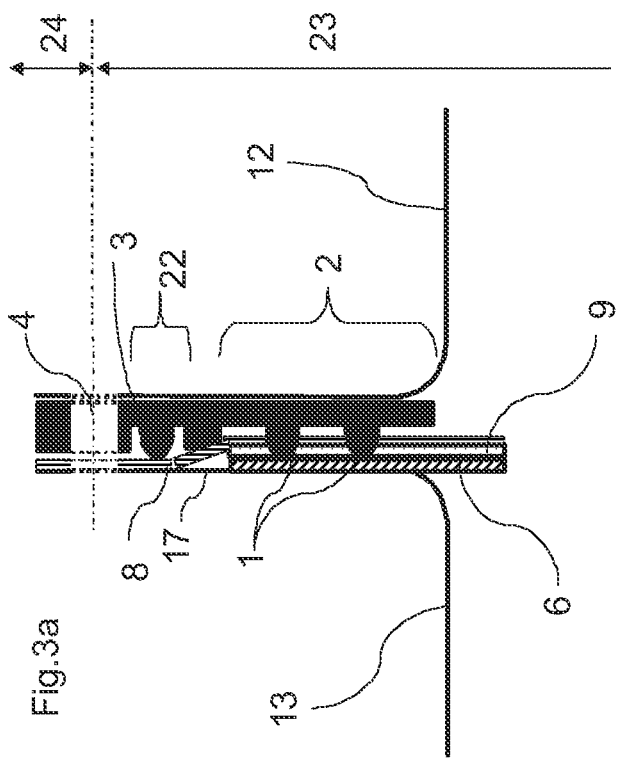

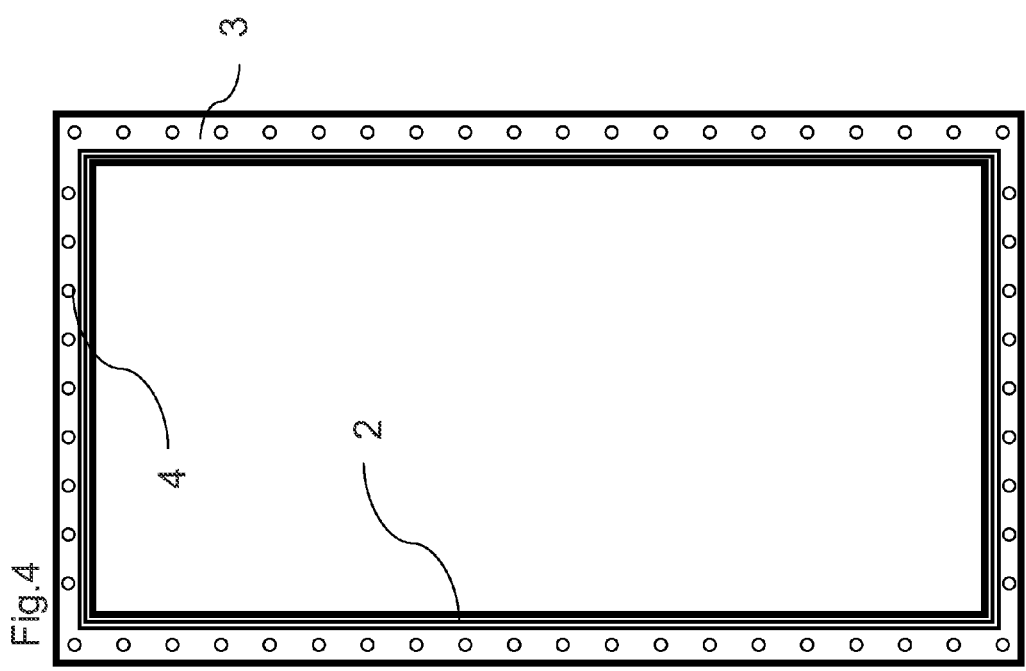

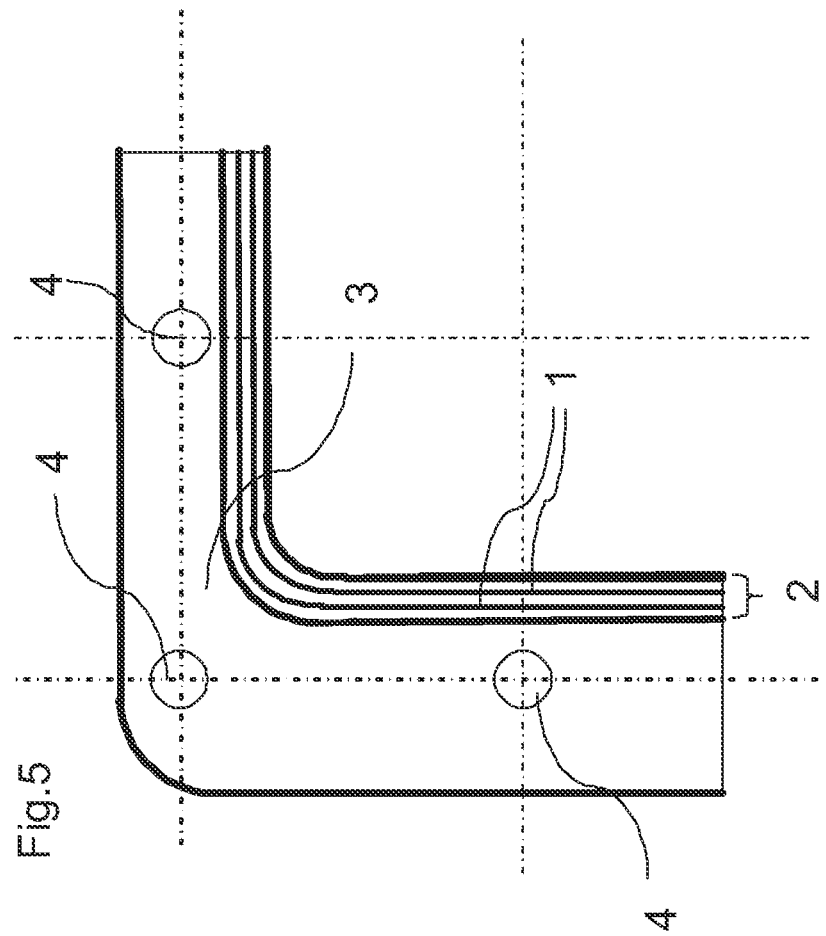

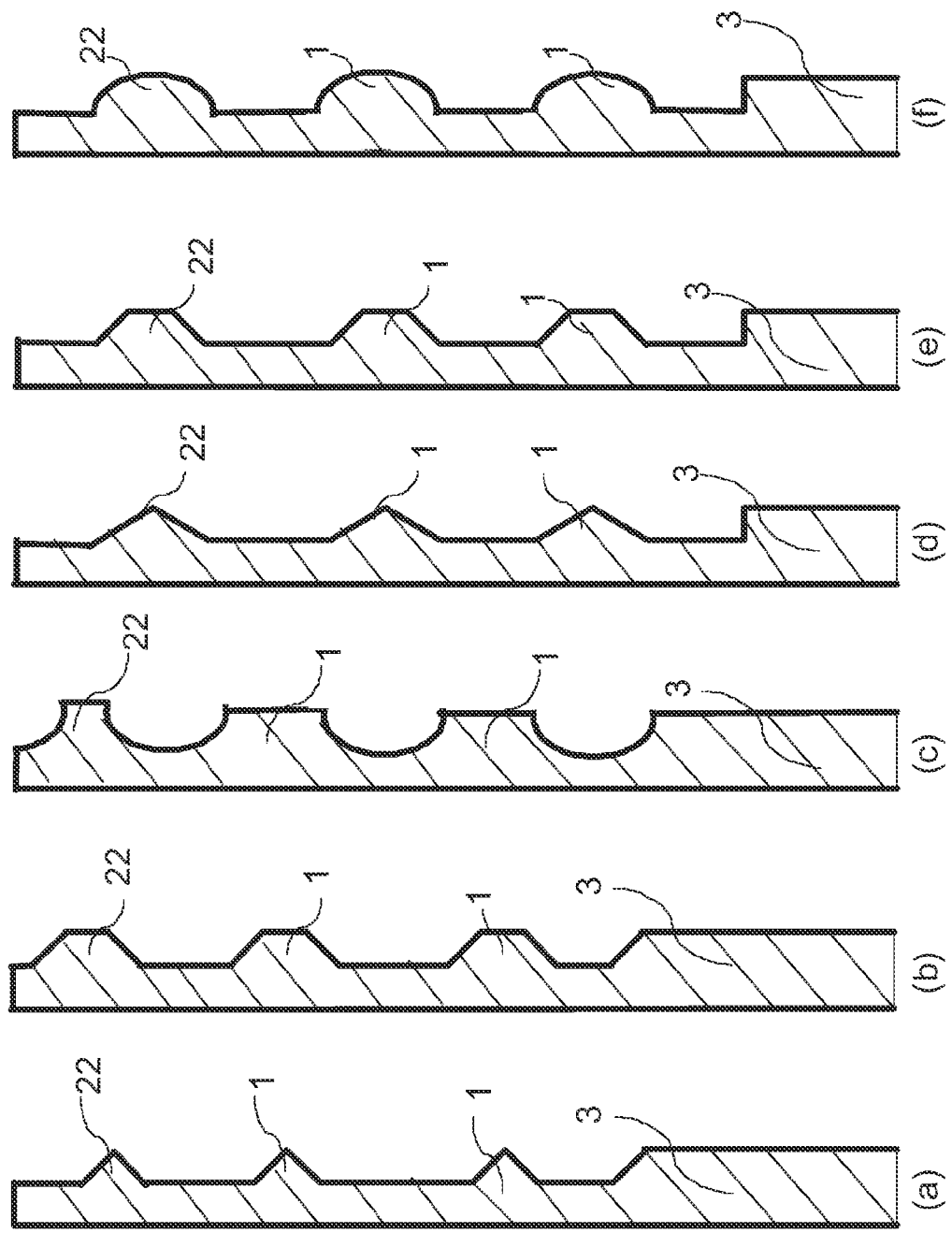
Fig.6 (a)-(f)

ELECTROCHEMICAL CELL HAVING A FRAME SEAL FOR ALTERNATIVE SEALING AGAINST MARGINAL LEAKAGES OF THE ELECTROLYTE

This application is a U.S. national stage of PCT/EP2012/001682 filed on Apr. 19, 2012 which claims the benefit of priority from German Patent Application No. 102011100768.0 filed May 6, 2011, the contents of each of which are incorporated herein by reference.

FIELD OF THE INVENTION

The present invention can be attributed to the technical field of electrochemical equipment.

The present invention relates to an electrochemical apparatus as characterised in the preamble of claim 1. This is understood to be an apparatus in which an electrochemical reaction takes place as, for instance, in the case of electrolysers, batteries, accumulators or fuel cells.

BACKGROUND OF THE INVENTION

During electrolysis, for example, electric energy is converted into chemical energy. This is achieved through the decomposition of a chemical compound by means of an electric current. The solution used as electrolyte contains positively and negatively charged ions. Therefore, mainly acids, bases or salt solutions are used as electrolyte.

In the case of the electrolytic production of halogen gases from aqueous alkali halide solution—here represented by sodium chloride—the following reaction takes place on the anode side:

$$4NaCl \rightarrow 2Cl_2 + 4Na^+ + 4e^- \tag{1}$$

The liberated alkali ions move to the cathode where they form caustic with the hydroxide ions produced there. In addition, hydrogen is formed:

$$4H_2O + 4e^- \rightarrow 2H_2 + 4OH^- \tag{2}$$

The caustic produced is separated from the alkali halide, which is fed to the anode side, by means of a cation exchange membrane, and in this way separated from each other. Membranes of such kind are state-of-the-art and commercially available from various suppliers.

The standard potential at the anode which is generated by formation of chlorine when the above reaction takes place is +1.36 V, with the standard potential at the cathode being −0.86 V when the above reaction takes place. A cell design of such kind is known from WO98/55670, for example. The difference of these two standard potentials yields an enormous energy input which is required to perform these reactions. In order to minimise this differential amount, gas-diffusion electrodes (hereinafter referred to as GDE) are used on the cathode side no that oxygen is supplied by the system resulting in the following reaction at the cathode instead of reaction (2):

$$O_2 + 2H_2O + 4e^- \rightarrow 4OH^- \tag{3}$$

The oxygen can be supplied as pure gas or by means of air. The resulting basic overall reaction of the chlor-alkali electrolysis using gas-diffusion electrodes is the following:

$$4NaCl + O_2 + 2H_2O \rightarrow 4NaOH + 2Cl_2 \tag{4}$$

As the standard potential of reaction (3) is +0.4 V, significant energy savings are achieved by the use of the GDE technology as compared to the conventional electrolysis with the formation of hydrogen.

Gas-diffusion electrodes have been used for many years in batteries, electrolysers and fuel cells. The electrochemical conversion in these electrodes takes place exclusively at the so-called three-phase boundary. Referred to as three-phase is boundary is the zone where gas, electrolyte and metallic conductor coexist. To ensure that the GDE works effectively, the metallic conductor should also figure as a catalyst for the desired reaction. Typical catalysts in alkaline systems are silver, nickel, manganese dioxide, carbon and platinum. Great efficiency of the catalysts is ensured if their surface is large, which is achieved by fine or porous powders with specific surface area.

Problems in the use of such gas-diffusion electrodes as disclosed in U.S. Pat. No. 4,614,575, for example, are due to the fact that the electrolyte would penetrate into these fine-pored structures by capillary effect and fill them up. This effect would make the oxygen stop diffusing through the pores and would thus stop the intended reaction.

To ensure that the reaction takes place effectively at the three-phase boundary, it is required to avoid the beforementioned problem by selecting the pressure conditions accordingly. The formation of a liquid column in a static liquid as in the case of the electrolyte solution causes, for example, the hydrostatic pressure to reach its highest value at the lower end of the column, which would intensify the above-described phenomenon.

As known from the relevant literature, this problem is solved by using falling-film evaporators. The electrolyte, such as caustic soda solution NaOH or caustic potash solution KOH, for example, is caused to pass through a porous material between the membrane and the GDE, thus preventing the formation of a hydrostatic column. This is also referred to as percolation technology.

WO 03/42430 describes such an electrolysis cell, which uses this principle for the chlor-alkali electrolysis reaction with an oxygen consumption reaction. In this, the oxygen is separated from the porous material by the gas-diffusion electrode and the oxygen and the porous material—the percolating agent—are pressed together by means of a conductive supporting structure and a conductive flexible spring element.

Such a principle is also known from DE 102004018748, for example. Here, an electrochemical cell is described which consists of at least one anode compartment with an anode, a cathode compartment with a cathode and an ion exchange membrane arranged between the two compartments, with the anode and/or cathode being a gas-diffusion electrode, a gap being arranged between the gas-diffusion electrode and the ion exchange membrane, an electrolyte inlet above the gap and an electrolyte outlet below the gap as well as a gas inlet and a gas outlet, the electrolyte inlet being connected to the electrolyte receiver and consisting of an overflow.

However, the objective of the use of the gas-diffusion electrode in the electrolysis apparatus described is not only to allow the catalytic oxygen consumption reaction. The electrode is also expected to ensure the separation of electrolytes and gas on both sides of the GDE. For this purpose, it is absolutely essential to provide the gas-diffusion electrode with gas-tight and/or liquid-tight sealing by the fixing method selected in order to ensure—especially after entry of the electrolyte into the cell—that the electrolyte is routed along the gas-diffusion electrode as specified and does not reach the electrolyte outlet of the electrochemical cell via areas not adequately sealed and thus constituting alternative routes, consequently not being available for the reaction.

As gas-diffusion electrodes are subject to ageing and thus to wear, they must be replaced after a certain operating period. Prior art provides for the welding of the gas-diffusion electrodes to the cathode compartments, which makes replacement very laborious.

This is described, for example, in DE 103 30 232 A1. Here, an electrochemical compartment is described in which the GDE includes a coating-free edge area and is connected to a supporting structure welded to an electrically conductive plate. Apart from the difficult replacement, this technology also involves the essential disadvantage that there is a great loss of active electrode surface area due to the existing welds, which causes a decrease in the efficiency of the electrolysis cell.

An alternative method of fixing the gas-diffusion electrodes is described in DE 101 52 792. Here, a method is described in which a gas-diffusion electrode is connected to the base structure of the electrolysis apparatus unit by means of a circumferential fold-type frame. As a mere clamping method, this method is more advantageous with regard to replaceability than that described in DE 103 30 232. However, as in this case as well, the frame and the base structure are connected by welding or soldering for the minimisation of ohmic losses, the disadvantage of difficult replacement and the loss of active electrode surface area due to welds still persist.

DE 103 21 681 A1 discloses seal assemblies for electrolysis cell arrangements, the seal assemblies comprising a first sheet surface and a second sheet surface as well as a first cord-like seal acting essentially as a spacer and a second cord-like seal, both provided at a certain distance between the first sheet surface and the second sheet surface. The arrangement inside the cell provides for one seal overlapping with the membrane, this being followed by a bore and the second seal being provided in the outer area of the electrolysis cell, with the second seal acting as a spacer only and being without sealing effect. The disadvantage involved is that it is not possible to ensure complete sealing in this way and leaks may occur due to the bores.

U.S. Pat. No. 4,721,555 A describes an electrochemical cell which is provided with a circumferential gasket frame in the overlapping area of membrane and cell frame, the gasket frame featuring a plurality of shaped sections. This solution also still involves the risk of leaks.

Therefore, it is the objective of the present invention to find a technical solution which first ensures adequate sealing especially of the gas room against the electrolyte room in order to prevent the electrolyte from reaching the electrolyte outlet via areas not adequately sealed such as the vertical edge areas between the gas-diffusion electrode and the insulating gasket frame, the electrolyte in such case not being available for the electrochemical reaction. In addition, the gas-diffusion electrode is also to be fixed in the electrochemical cell to ensure simple assembly and disassembly of the gas-diffusion electrode and to thus provide an as large active electrode surface area as possible for the electrochemical reaction. Furthermore, the sealing is to ensure the electrical insulation of the anode from the cathode in order to allow for the intended functioning mode of the electrochemical cell.

SUMMARY OF THE INVENTION

The objective is achieved by an electrochemical cell comprising an anode compartment (14) and a cathode compartment (15) separated from each other by a membrane (8), housing the corresponding electrodes, and the anode compartment (14) and the cathode compartment (15), each having an external wall (12,13) with frame-type flanged areas (16,17) in the contact area of both compartments, the flanged areas (16 and 17) being provided with mounting bores (4) marking an inner area (23) and an outer area (24) of the electrochemical cell, and a gas-diffusion electrode (6) resting on a support system (7), and a porous material (9) resting on the gas-diffusion electrode (6), as well as devices for the inlet and outlet of gas (18,19) and electrolyte (20,21).

The present invention is particularly characterised in that at least one circumferential gasket frame (3) is provided in the contact area of both compartments between the frame-type flanged areas (16 and 17) of the external walls (12 and 13) of both compartments, said gasket frame resting on the membrane (8), with the porous material (9) and the gas-diffusion electrode (6) resting on the frame-type cathodic flanged area (17) and the circumferential gasket frame (3) overlapping in this area with the porous material (9) and the gas-diffusion electrode (6), with this overlapping area (2) featuring at least two shaped sections (1), with the circumferential gasket frame having at least one additional shaped section (22) and/or at least one shapeable sealing cord in the contact area of both compartments between the frame-type flanged areas (16 and 17) outside of the overlapping zone of porous material (9) and gas-diffusion electrode (6), with the additional shaped section (22) and/or shapeable sealing cord (5) being arranged in the inner area (23) of the electrochemical cell.

By locating the gasket inside the electrochemical cell in the claimed manner it is possible to ensure adequate sealing and to avoid the disadvantages of the prior art.

In an advantageous embodiment, the contrivance is equipped with shaped sections (1) which are of any geometric design and preferably have a triangle form, a trapezoidal form or a semi-spherical form.

In a preferred embodiment, the gasket frame (3) is made of a material which is caustic-proof and oxygen-resistant up to temperatures of approx. 100° C.

The present invention also claims possible uses of the electrochemical cell according to the invention as electrolysis cell in an electrolyser in which a plurality of electrolysis cells are arranged in stacks.

The present electrochemical cell is advantageously used in a battery in which chemical energy is converted to electric energy by an electrochemical oxidation-reduction reaction.

It is also possible to use the electrochemical compartment in a fuel cell in which chemical energy is converted to electric energy by the addition of a fuel and an oxidant.

BRIEF DESCRIPTION OF THE DRAWINGS

The embodiment variants of the invention are described in more detail below by FIGS. 1-6.

FIGS. 2a-b: represent a schematic process sketch of the typical arrangement of the components in the flanged area of an electrochemical cell according to the invention with sealing variants towards the outside.

FIGS. 3a-b: represent a schematic process sketch of the flanged area of an electrochemical cell according to the invention in assembled state for showing the mode of operation of the gasket frame with sealing variants towards the outside.

FIG. 4: represents a schematic process sketch of the gasket frame with and without mounting bores for bolting of an electrochemical cell according to the invention.

FIG. 5: represents a schematic process sketch of a corner area of the gasket frame of an electrochemical cell according to the invention.

FIGS. 6a-f: represent schematic process sketches of variants of shaped sections of the gasket frame of an electrochemical cell according to the invention.

DETAILED DESCRIPTION OF THE INVENTION

Figure 1:
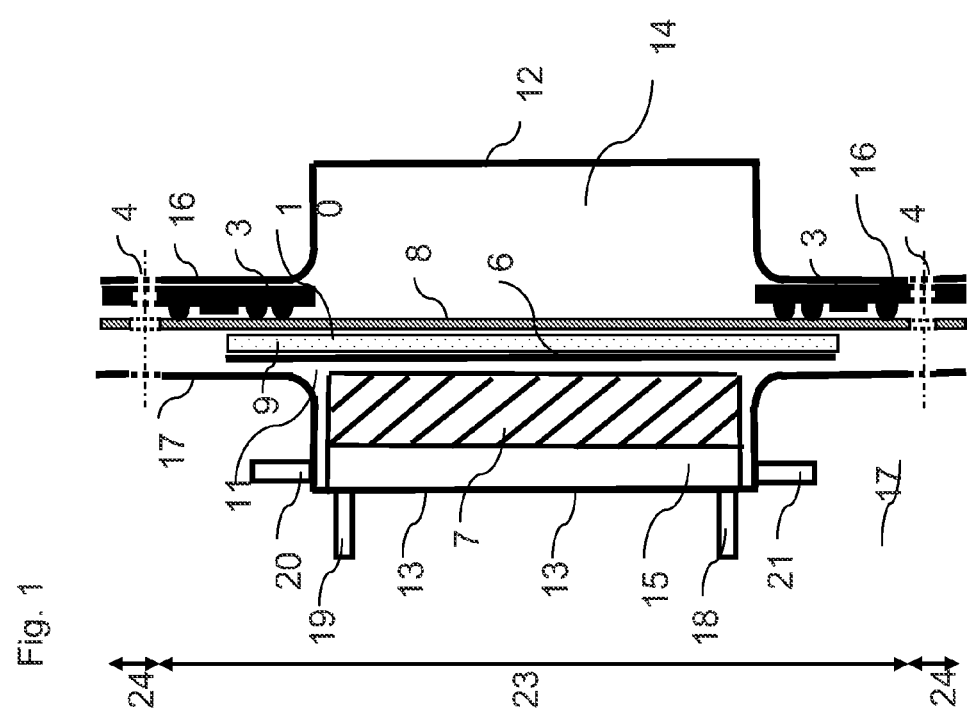
FIG. 1: represents a schematic process sketch of an electrochemical cell according to the invention and gives an overall cross-sectional view from above.

FIG. 1 shows an electrochemical cell according to the invention consisting of an anode compartment 14 and a cathode compartment 15 which are separated from each other by a membrane 8. Both compartments 14, 15 are equipped with external walls 12 und 13 and frame-type flanged areas 16 and 17. Membrane 8, porous materials 9, gasket frames 3 and other components if required can be clamped between the frame-type flanged areas of cathode compartment 16 and the flanged areas of anode compartment 17 for the electrical isolation of the anode from the cathode. By such clamping it is possible, for example, to fix membrane 8 and porous material 9 and to achieve the sealing of the electrochemical cell towards the outside. In the operation of the electrochemical cell, porous material 9 serves as the percolating agent, with the electrolyte between membrane 8 and gas-diffusion electrode 6 being routed through electrolyte room 10, the percolator. The gas required for the electrochemical reaction and the electrolyte are supplied by means of devices 18, 20 and discharged by means of devices 19, 21.

Gas-diffusion electrode 6 is held in the electrolysis cell by supporting elements 7. Gas-diffusion electrode 6 is made of a liquid-permeable carrier coated with a catalyst material. In this, the catalyst-coated area of gas-diffusion electrode 6 forms the active area where the electrochemical reaction of the cathode takes place. This active area includes the entire gas-diffusion electrode except for the sealing area which is to be designed to be as small as possible in order to obtain an active area of gas-diffusion electrode 6 which is as large as possible for the electrochemical reaction.

The sealing area is defined by the contact area of both compartments between frame-type flanged areas 16 and 17 of external walls 12 and 13 of both compartments, the mounting bores 4 marking an inner area 23 and an outer area 24 of the electrochemical cell. The schematic arrangement of the components is shown in detail in FIGS. 2a-b: Gas-diffusion electrode 6 and porous material 9 rest on cathodic flanged area 17, with circumferential gasket frame 3 featuring at least two shaped sections in this area which overlap with gas-diffusion electrode 6 and porous material 9, and both components in assembled state being pressed together with interposed membrane 8. At least one additional shaped section 22 is provided outside of the overlapping area of porous material 9 and gas-diffusion electrode 6 but still located in the inner area 23 of the electrochemical cell. This is also referred to as outer shaped-section area of the gasket frame. In the outer area of electrochemical cell 24 gasket frame 3 is wedge-shaped and not provided with any additional shaped sections. By this type of arrangement of the gasket frame in the electrochemical cell, the leakage rate can be reduced to a minimum.

Another embodiment variant for improved sealing of the electrochemical cell against the escape of electrolyte or gas towards the outside is shown in FIG. 2b. FIG. 2b shows the arrangement of an additional shapeable sealing cord located in the contact area of both compartments between frame-type flanged areas 16 and 17 outside of the overlapping area of porous material 9 and gas-diffusion electrode 6 in the inner area 23 of the electrochemical cell.

FIGS. 3a-b show the contact area of both compartments between frame-type flanged areas 16 and 17 in assembled and pressed state for illustrating the circumferential internal sealing of the porous material against electrolyte percolating over the edges. This is achieved by the interaction of the at least two shaped sections located in the overlapping area 2 of porous material 9 and gas-diffusion electrode 6 and the at least one additional shaped section 22 located outside of the overlapping area of porous material 9 and gas-diffusion electrode 6 but arranged in inner area 23 of the electrochemical cell. Inner shaped section 1 of gasket frame 3 presses membrane 8 and porous material 9 onto gas-diffusion electrode 6 supported by cathodic flanged area 17 and additional shaped section 22 presses membrane 8 onto flanged area 17. The at least two inner shaped sections provided on gasket frame 3 prevent the escape of liquid beyond the shaped section. The sealing towards the outside is achieved by pressing membrane 8 between cathodic flanged area 17 and additional shaped section 22 of gasket frame 3 as shown in FIG. 3a. In so doing, membrane 8 is directly pressed onto frame-type cathodic flanged area 17.

Another embodiment variant for improved sealing of the electrochemical cell against the escape of electrolyte or gas towards the outside is shown in FIG. 3b. FIG. 3b shows the use of an additional shapeable sealing cord located in the contact area of both compartments between frame-type flanged areas 16 and 17 outside of the overlapping area of porous material 9 and gas-diffusion electrode 6 in inner area 23 of the electrochemical cell, and in assembled state pressed between membrane 8 and cathodic flanged area 17, thus ensuring improved sealing and either replacing additional shaped section 22 or being used in combination with the latter.

FIG. 4 shows an overall view of gasket frame 3 with inner shaped-section area 2 consisting of two inner shaped sections 1 for adequate liquid-tight sealing, which are located in the overlapping area of porous material 9 and gas-diffusion electrode 6, and at least one additional shaped section located outside of the overlapping area but in the inner area of the electrochemical cell. Pressing of the gasket frame is achieved by fastening with bolts through mounting bores 4.

FIG. 5 shows in detail an embodiment of gasket frame 3 with mounting bores 4, the mounting bores being centrally arranged at equal spacing and forming a right angle in the corner area.

FIG. 6 shows in variants a) to f) exemplary embodiments of shaped sections 1 and additional shaped section 22 of any geometric design, for example, triangle forms (FIGS. 6a and 6d), trapezoidal forms (FIGS. 6b and 6e) or semi-spherical forms (FIGS. 6c and 6f). In this, the shaped sections can be produced by direct profiling of the shaped sections (FIGS. 6a-6c) or by removal of the material around the shaped sections (FIGS. 6d-6f).

Advantages Resulting from the Invention adequate sealing of the electrolyte room (porous material) ensured by providing the gasket frame with shaped sections according to the invention for pressing and fixing of porous material and membrane with the gas-diffusion electrode electrical isolation of anode and cathode simple assembly and disassembly of the gas-diffusion electrode small inactive sealing area ensures large active electrode surface area which can be used for the electrochemical reaction prevention of edge areas between gas-diffusion electrode and porous material on the one hand and sealing cord for the external sealing on the other hand so that no electrolyte reaches the electrolyte outlet and thus becomes unavailable for the electrochemical reaction.

LIST OF REFERENCE NUMBERS AND DESIGNATIONS

1 Shaped section
2 Inner shaped-section area of gasket frame
3 Gasket frame
4 Mounting bore for bolting
5 Sealing cord
6 Gas-diffusion electrode
7 Supporting system
8 Membrane
9 Porous material
10 Electrolyte room
11 Gas room
12 External wall of anode compartment
13 External wall of cathode compartment
14 Anode compartment
15 Cathode compartment
16 Flanged area of anode compartment
17 Flanged area of cathode compartment
18 Device for gas inlet
19 Device for gas outlet
20 Device for electrolyte inlet
21 Device for electrolyte outlet
22 Additional shaped section
23 Inner area of electrochemical cell
24 Outer area of electrochemical cell

The invention claimed is:

1. An electrochemical cell comprising:
an anode compartment having an external wall with frame-type flanged area;
a cathode compartment having an external wall with frame-type flanged area;
mounting bores provided on the frame-type flanged areas of the anode and cathode compartments, and marking an inner area and an outer area of the electrochemical cell;
a membrane separating the anode compartment and the cathode compartment;
a support system housed in the cathode compartment;
a gas diffusion electrode resting on the support system and on the frame-type flanged area of the cathode compartment;
a porous material resting on the gas-diffusion electrode, having its opposite side in contact with the membrane;
a gas inlet and a gas outlet;
an electrolyte inlet and an electrolyte outlet;
at least one circumferential gasket frame in a contact area where the frame-type flanged areas of both the anode and cathode compartments meet, the at least one circumferential gasket frame resting on the membrane, and where there is contact between the membrane and the porous material resting on the gas diffusion electrode; and
an overlapping zone within the inner area of the electrochemical cell where there is no contact between the membrane and the porous material resting on the gas diffusion electrode,
wherein
the circumferential gasket frame has at least two shaped sections in the contact area; and
the circumferential gasket frame has at least one additional shaped section or at least one shapeable sealing cord in the overlapping zone.

2. The electrochemical cell of claim 1, wherein the at least two shaped sections in the contact area are of a geometric design.

3. The electrochemical cell of claim 2, wherein the geometric design is a triangle form, a trapezoidal form or a semi-spherical form.

4. The electrochemical cell of claim 1, wherein the at least one circumferential gasket frame is made of a material which is caustic-proof and oxygen-resistant up to a temperature of approximately 100° C.

5. The electrochemical cell of claim 1, wherein the at least one additional shaped section in the overlapping area is of a geometric design.

6. The electrochemical cell of claim 5, wherein the geometric design is a triangle form, a trapezoidal form or a semi-spherical form.

7. An electrolyzer comprising a plurality of electrochemical cells of claim 1, wherein the plurality of electrochemical cells are arranged in stacks.

8. A battery comprising the electrochemical cell of claim 1, wherein the chemical energy is converted to electric energy by an electrochemical oxidation-reduction reaction.

9. A fuel cell comprising the electrochemical cell of claim 1, wherein chemical energy is converted to electric energy by the addition of a fuel and an oxidant.

10. An electrochemical cell comprising:
an anode compartment having an external wall with frame-type flanged area;
a cathode compartment having an external wall with frame-type flanged area;
mounting bores provided on the frame-type flanged areas of the anode and cathode compartments, and marking an inner area and an outer area of the electrochemical cell;
a membrane separating the anode compartment and the cathode compartment;
a support system housed in the cathode compartment;
a gas diffusion electrode resting on the support system and on the frame-type flanged area of the cathode compartment;
a porous material resting on the gas-diffusion electrode, having its opposite side in contact with the membrane;
a gas inlet and a gas outlet;
an electrolyte inlet and an electrolyte outlet;
at least one circumferential gasket frame in a contact area where the frame-type flanged areas of both the anode and cathode compartments meet, the at least one circumferential gasket frame resting on the membrane, and there is contact between the membrane and the porous material resting on the gas diffusion electrode; and an overlapping zone within the inner area of the electrochemical cell where there is no contact between the membrane and the porous material resting on the gas diffusion electrode, wherein the circumferential gasket frame has at least two shaped sections in the contact area; and the circumferential gasket frame has at least one additional shaped section and at least one shapeable sealing cord in the overlapping zone.

11. The electrochemical cell of claim 10, wherein the at least two shaped sections in the contact area are of a geometric design.

12. The electrochemical cell of claim 11, wherein the geometric design is a triangle form, a trapezoidal form or a semi-spherical form.

13. The electrochemical cell of claim 10, wherein the at least one circumferential gasket frame is made of a material which is caustic-proof and oxygen-resistant up to a temperature of approximately 100° C.

14. The electrochemical cell of claim 10, wherein the at least one additional shaped section in the overlapping area is of a geometric design.

15. The electrochemical cell of claim 14, wherein the geometric design is a triangle form, a trapezoidal form or a semi-spherical form.

* * * * *